Patented Feb. 6, 1934

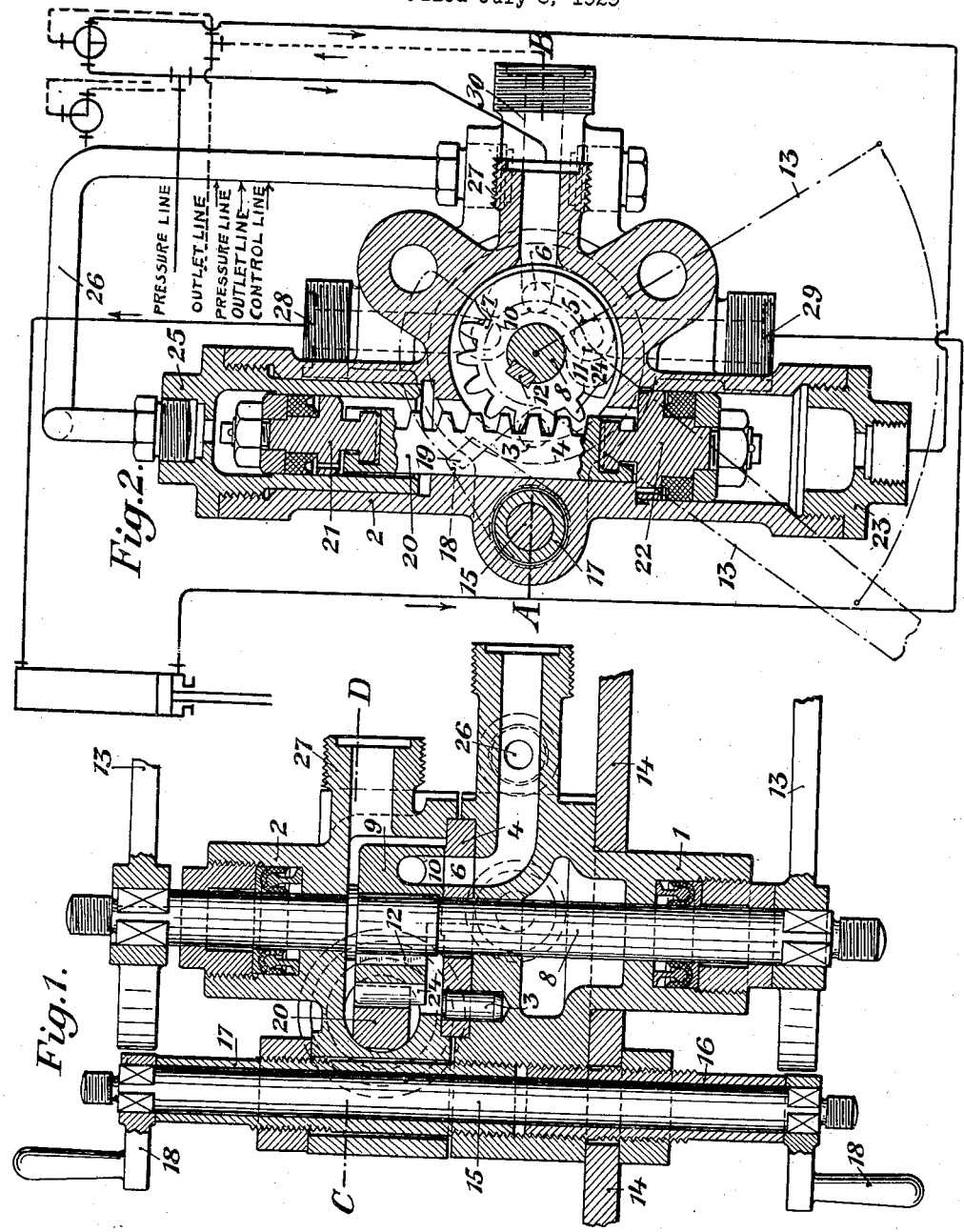

1,945,680

UNITED STATES PATENT OFFICE 1,945,680

HYDRAULIC FOUR-WAY VALVE

Paul Fahrenkamp, Bremen, Germany, assignor to Atlas-Werke Aktiengesellschaft, Bremen, Germany, a corporation of Germany Application July 8, 1929, Serial No. 376,579, and in Germany July 14, 1928

3 Claims. (Cl. 137—139)

Four-way valves controlled by liquid pressure, such as are used more particularly for devices for opening and closing bulkhead doors by hydraulic pressure, are normally made in the form of cocks with conical plugs tensioned by pressure screws. Valves of this type close tightly so long as there is a layer of grease between the plug and the casing. If however this layer of grease is washed away by the liquid flowing through the valve, which liquid is frequently dirty, there is produced a free space between the plug and the casing, and the cock thereby becomes leaky. It is true that this leakage may be eliminated by tightening the pressure screw, but this gives rise to the disadvantage that, owing to the wedging action of the conical plug and to the greaseless surfaces of the cock and plug rubbing against each other, the latter becomes jammed. The jamming of the plug must be avoided by all means, particularly in the case of valves for safety devices, and such jamming can be avoided by providing large pistons for rotating the plug. When in such a case the plug has to be moved by hand, in opposition to the action of the piston, great difficulties arise as the hand lever must then be made of a length which in most cases is inadmissible on account of lack of space.

The object of the present invention is to provide a four-way valve which may be operated by a liquid as well as by hand and which operates in a reliable and perfect manner under any conditions and is easily operated.

For attaining this object, according to the invention a valve provided with teeth is keyed to a spindle adapted to be rotated by hand and a rack co-operating with the said teeth is connected at its ends to pistons of different sizes which are slidably mounted in cylinders connected to the control pipe or to the waste water pipe.

A construction according to the invention is illustrated by way of example in the accompanying drawing, in which:

Figure 1 is a longitudinal section through the valve according to the invention on the line A—B of Figure 2, and Figure 2 a section on the line C—D of Figure 1 and including various fittings to which the pipe lines are secured.

In the bottom part of the valve casing 1 and 2 made in two parts, is secured by means of a pin or a screw 3, a seat 4 having the openings 5, 6 and 7 therein. Through both parts 1 and 2 of the valve extends a spindle 8 which carries a rotary disc 9 in the form of a valve and having openings 10 and 11 therein, the distance between which is equal to the distance of the openings 5 and 6 or 6 and 7 of the seat 4. The valve 9 is rigidly secured to the spindle 8 by means of a key 12, and to each square end of the spindle 8 is secured a lever 13 in order to enable the valve 9 to be rotated manually on both sides of a partition or wall wherein the valve is mounted, for instance both sides of a bulkhead 14. Parallel to the spindle 8, in the valve body 1 and 2 is rotatably mounted a second spindle 15 in a sleeve of two sections 16 and 17, and to each of the squared ends of this spindle is secured a bolt or handle 18 whereby the handle may be brought into engagement manually with a recess 19 of the lever 13 for the purpose of latching the valve in the set position.

In a plane at right angles to the plane of the spindles 15 and 8, and between the latter, a toothed rack 20 is adjustably mounted, one end of which is connected to a relatively small piston 21, while the other end is connected to a piston 22 of a larger diameter. The bottom face of the piston 22 is in communication with the pressure in the control pipe connected to the fitting 23. The rack 20 co-operates with teeth 24 provided on the circumference of the valve 9, in order to enable the valve 9 to be actuated by hydraulic pressure. On the cylinder in which the piston 21 is provided, a fitting 25 is secured which is connected to the water pipe 26.

The valve 9 and the small piston 21 are influenced by the pressure in the pipe connected to the fitting 27, that is, the valve 9 is held on its seat by the pressure in the pipe. Consequently the force acting on the valve 9 and the force acting on the valve turning device are always proportional to one another. In other words, the pressure on the piston 21 is always proportional to the pressure on the valve 9, that is the fitting 27, which means that when the pressure in fittings 27 changes, then the pressure on the piston 21 and valve 9 will also change. The large piston 22 acts when there is pressure in the control pipe connected to the fitting 23, so that here also the force acting on the valve 9 and the force acting on the valve turning device are always proportional to one another.

The water under pressure admitted into the upper part 2 passes through the opening 7 in the seat 4 uncovered by the valve, through the upper branch union 28 of the valve casing 1, for instance to the upper side of a pressure cylinder closing the bulkhead door, whereby the door is closed. The latter action is possible only when there is pressure in the control pipe. On the contrary, when there is no pressure in the said pipe, the valve 9 is rotated when the lever 18 is unbolted and uncovers the opening 5 in the seat 4 for the water under pressure, so that the water under pressure then flows through the branch 29 to the bottom side of the pressure cylinder controlling for instance a bulkhead door, whereby this door is then opened. When the lever 18 is bolted, if the valve is used for instance for a device for opening and closing bulkhead doors, the door remains closed even when there is no pressure in the control pipe. Figure 2 indicates the various fittings 23 and 27 to 30 showing the various pipe lines which are secured thereto. This has been clearly explained in the patent referred to below.

The operation of the device will be clearly understood from the following and also when considered in connection with the system of operating bulkhead doors as disclosed in U. S. Patent No. 1,832,337 in Figs. 11 to 14 and their description.

The four possible connections are as follows:

*1st setting.*—In the position of the valve 9, illustrated in Fig. 2, the fluid under pressure flows from the fitting 27 through the cavity of the housing 2, the passage 7 of the seat 4, and the fitting 28 in the upper chamber of a pressure cylinder and then, for example, closes a bulkhead door.

*Another path of flow.*—The waste water from the lower chamber of this pressure cylinder flows through the fitting 27, the passage 5 of the seat 4, the passage 11—10 of the valve 9, the passage 6 of the seat 4 and the fitting 30 into the waste water pipe.

*2nd setting.*—The piston 22 is in its lower position, and hereby the valve 9 has been rotated so that the passage 11 of the valve 9 is aligned with the passage 6 of the seat 4 and the passage 10 of the valve 9 is alined with the passage 7 of the seat 4, the passage 5 of the seat 4 then being connected with the liquid in the cavity of the housing 2. The pressure fluid now flows through the fitting 27, the passage 5 of the seat 4 and the fitting 29 into the lower chamber of a pressure cylinder which then, for example, opens a bulkhead door.

*Another path of flow.*—The waste water flows out of the upper chamber of the pressure cylinder through the fitting 28, the passage 7 of the seat 4, the passage 10—11 of the valve 9, the passage 6 of the seat 4 and the fitting 30 into the waste water pipe.

To the fitting 27 there is permanently connected a source of fluid under pressure and to the fitting 30 a pipe is permanently connected for carrying off the waste water while to the fitting 23 there is connected a pipe which may carry either water under pressure or waste water. When the fitting 23 receives water under pressure, this is the same as the pressure in fitting 27, since the source of pressure is the same.

The valve is controlled as follows:

(A) Let it be assumed that the fitting 23 is supplied with liquid under pressure. The large piston 22 is influenced by means of liquid under pressure from the fitting 23, and the piston 22, furthermore, is influenced by means of liquid under pressure from the fitting 27, on the side of the cavity of the housing 2. The small piston 21 is influenced from the side of the cavity of the housing 2 by means of liquid under pressure from the fitting 27. Inasmuch as the two pistons 22 and 21 are connected by a rack bar 20 the large piston 22 is moved into the upper position (Fig. 2) by means of the liquid under pressure from the fitting 23. The water under pressure will now flow in accordance with the 1st setting, and the waste water in accordance with the other path of flow and the pressure cylinder, for example, will close a bulkhead door. By reversing the lever 13 from the left to the right, the rack bar with the pistons 21 and 22 will be brought into the lowermost position in opposition to the pressure of the liquid under pressure from the fitting 23 and the water under pressure will now flow in accordance with the 2nd setting and the waste water in accordance with the other path of flow and the pressure cylinder, for example, will open the bulkhead door. This is necessary to permit persons possibly isolated in a room of the ship to leave this room. After the release of the lever 13, this is again returned to the left-hand setting by means of the liquid under pressure from the fitting 23 through the rack bar 20, the toothed valve 9 and the shaft 8 keyed thereto. The water under pressure now again flows through in accordance with the 1st setting, the waste water the other path of flow and the pressure cylinder, for example, will again close a bulkhead door.

(B) Let it be assumed that the fitting 23 carries waste water. The fitting 27 is continuously supplied with water under pressure, and hereby the pistons 21 and 22 are influenced from the side of the cavity of the housing 2 by means of water under pressure. Inasmuch as the two pistons are connected by the rack bar and the piston 22 is larger than the piston 21, the rack bar is brought to the lowermost position with the pistons 21 and 22. The water under pressure now flows in accordance with the 2nd setting, the waste water the other path of flow and the pressure cylinder, for example, opens a bulkhead door.

(C) By the latching of the bolt 18 into the notches 19 of the levers 13 the valve 9 is retained in the position shown in Fig. 2. The water under pressure then always flows in accordance with the 1st setting, and the waste water in the other path of flow, that is, the pressure cylinder, for example, holds a bulkhead door always in the closed position regardless of whether the fitting 23 conducts water under pressure or waste water.

I claim:

1. A four-way, liquid pressure controlled valve particularly adapted to cooperate with bulkhead doors, comprising a shaft, means to rotate said shaft manually, a valve secured to said shaft to rotate therewith, and provided with gear teeth on a portion of its periphery, a rack meshing with said teeth, a piston at each end of said rack, said two pistons being of different sizes, and a cylinder for each said piston, one cylinder being connected to control pipe and the other cylinder to a waste water pipe and means for locking the shaft against rotation when desired, to temporarily prevent actuation of the valve.

2. A four-way valve in accordance with claim 1, wherein the means for locking the valve shaft comprises an additional shaft, said additional shaft being provided with a latch which is manually movable into position to cooperate with the first shaft to prevent rotation thereof.

3. A four-way valve in accordance with claim 1, wherein the shaft extends beyond both ends of the valve and has an operating means at both ends, whereby it may be operated from either side of a partition in which the valve is mounted.

PAUL FAHRENKAMP.